United States Patent
Therolf

(12) United States Patent (10) Patent No.: US 6,238,733 B1
(45) Date of Patent: May 29, 2001

(54) METHOD AND PLASTICATING EXTRUDER FOR PRODUCING FIBER-REINFORCED POLYMER COMPOSITIONS

(75) Inventor: Dieter Therolf, Vaihingen/Enz (DE)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 0 days.

(21) Appl. No.: 09/373,533

(22) Filed: Aug. 13, 1999

(30) Foreign Application Priority Data

Aug. 13, 1998 (DE) .............................. 198 36 787

(51) Int. Cl.⁷ ........................................................ B05D 1/28
(52) U.S. Cl. .......................... 427/209; 427/293; 156/180
(58) Field of Search .................... 427/289, 177, 427/293, 209; 156/180

(56) References Cited

U.S. PATENT DOCUMENTS

| | | | | |
|---|---|---|---|---|
| 5,096,406 | * | 3/1992 | Brooks et al. | 425/205 |
| 5,110,275 | | 5/1992 | Scheuring | 366/76 |
| 5,358,680 | | 10/1994 | Boissonnat et al. | 264/177.2 |
| 5,401,154 | * | 3/1995 | Sargent | 425/114 |
| 5,545,297 | * | 8/1996 | Andersen et al. | 264/102 |
| 5,879,602 | * | 3/1999 | Scheuring | 264/136 |
| 6,060,010 | * | 5/2000 | Sakai et al. | 264/211.21 |

FOREIGN PATENT DOCUMENTS

| | | |
|---|---|---|
| 2 033 272 | 1/1972 | (DE) . |
| 40 16 784 A1 | 11/1991 | (DE) . |
| 195 30 020 A1 | 2/1997 | (DE) . |
| 0 835 734 A1 | 4/1998 | (EP) . |
| 0 850 746 | 7/1998 | (EP) . |
| 1 330 395 | 7/1971 | (GB) . |
| WO 97/06936 | 2/1997 | (WO) . |

* cited by examiner

*Primary Examiner*—Shrive Beck
*Assistant Examiner*—Kirsten A. Crockford
(74) *Attorney, Agent, or Firm*—Foley & Lardner

(57) ABSTRACT

A method for producing fiber-reinforced polymer compositions and a plasticating extruder for carrying out the method. The method includes passing the fiber strand along at least one coating nozzle into a feed opening; winding the fiber strand onto and around at least one extruder shaft; drawing the fiber strand into barrel bores of a screw barrel; applying a liquid polymer onto a first flat side of the fiber strand from the first coating nozzle; pressing a second side of the fiber strand into a liquid polymer film that was already applied on the screw shaft; and feeding the polymer impregnated fiber strand into screw barrels in a discharge and conveying zone. The plasticating extruder has a drawing-in and impregnating zone and a discharge and conveying zone. The plasticating extruder has a heater. In the drawing-in and impregnating zone, there are a first barrel; a polymer feed including at least one coating nozzle; first barrel bores in the first barrel; rotationally driven first extruder shafts in the first barrel bores; and a feed opening in the first barrel for introducing a fiber strand into the first barrel bores. In the discharge and conveying zone, there are a second barrel; a cutting edge at an entrance to the second barrel; second barrel bores in the second barrel; and rotationally driven second extruder shafts in the second barrel bores.

12 Claims, 3 Drawing Sheets

METHOD AND PLASTICATING EXTRUDER FOR PRODUCING FIBER-REINFORCED POLYMER COMPOSITIONS

BACKGROUND OF THE INVENTION

1. Field of the Invention

The invention relates to a method for producing fiber-reinforced polymer compositions using a plasticating extruder and a plasticating extruder for carrying out the method.

2. Description of Related Art

A method and a plasticating extruder are disclosed in DE-C 40 16 784, in which the fiber strand enters the impregnating device and the strand exits after impregnation in a planar form. There is, however, little possibility that there will be good wetting of the fiber and the scattered material. The main problem, though, is that the individual fibers of the widely spread-apart fiber strand cannot be kept apart by the spreading lugs. The individual fibers are tied together in a compact strand by the 90° deflection from the guide transversely to the screw axis at the feed nozzle, up to the end of the impregnating channel and to the screw element of the extruder axis. This means that this compact strand, which comprises many endless individual fibers, is of a great thickness, thus leading to rapid pinching off or cutting off between the screw flights and the barrel wall. The resultant fiber entanglements, which are still not completely impregnated, are then very difficult to break up again with the mixing and kneading to be mixed with the remaining melt, or the mixing and kneading/shearing zone must be made so intensive and/or long that a very high proportion of very short fibers/fines are produced in the product as a result.

Furthermore, this results in more rapid pinching off of the compact fiber strand and uncontrolled slipping of the individual fibers. Different slipping rates of the glass fiber strands occur, which makes it extremely difficult or impossible for the machine to be in a state capable of carrying out the process, that is, undefined drive ratios and uncontrollable process states occur. Moreover, the pre-impregnated fiber strand has to be distributed homogeneously in the melt with the individual fibers while still in the mixing-in zone. The individual fibers pre-impregnated with liquid polymer are drawn in by the respective screw element and thereby cut or pinched off. As a result, the drive force that can be exerted on the fiber strand is relatively small, because it is not possible for an adequately large angle of wrap around the extruder shafts to occur. This also produces a great undefined slippage of the fibers in the feeding region, for which reason the fiber content in the polymer is subject to strong fluctuations. Measuring the changes in rate at the fed-in fiber strand and using the rotational-speed control on the extruder shafts to compensate for this error leads to a strong harmful pulsation in the molten polymer fed in the impregnating region and to pulsation in the mixing region and consequently in the product discharge. The envisaged melt control by the meter through the displaceable screw barrel does not solve this problem either, because when individual fibers slip considerably the rotational speed at the extruder shaft would have to be increased and more matrix melt would inevitably be conveyed from the melt located in the region of the screw. That is, the mixing ratio of fiber to matrix in this case changes disadvantageously. Furthermore, apart from the exact weight distribution of the glass fiber content, a pulsation-free even product discharge is required for product processing and material reproducibility.

The difficulties suggested in the preceding are not intended to be exhaustive but are among many tending to reduce the desirability of the known methods and the known plasticating extruders. Other noteworthy problems may exist; however, those presented above should be sufficient to demonstrate that those known methods and apparatuses are amenable to worthwhile improvements.

SUMMARY OF THE INVENTION

Accordingly, it is therefore a general object of the invention to provide a method and a plasticating extruder for producing fiber-reinforced polymer compositions that will obviate or minimize the above described difficulties.

It is a specific object of the invention is to provide a method and a plasticating extruder for producing fiber-reinforced polymer compositions with a good degree of mixing.

It is another object of the invention is to provide a method and a plasticating extruder for producing fiber-reinforced polymer compositions having good fiber impregnation.

It is still another object of the invention is to provide a method and a plasticating extruder for producing fiber-reinforced polymer compositions in which the long fibers make up as large a proportion as possible and the smallest or short fibers make up as small a proportion as possible of the product.

It is a further object of the invention is to provide a method and a plasticating extruder for producing fiber-reinforced polymer compositions in which the product discharge takes place steadily without pulsation.

A preferred embodiment of the method according to the invention intended to accomplish at least some of the foregoing objects includes passing the fiber strand along at least one coating nozzle into a feed opening of the plasticating extruder; winding the fiber strand onto and around at least one extruder shaft in a driving-forward manner; drawing the fiber strand into barrel bores of a screw barrel, wherein a diameter of the barrel bores is at least four times a thickness of the fiber strand; applying a liquid polymer onto a first flat side of the fiber strand from the at least one coating nozzle; pressing a second side of the fiber strand into a liquid polymer film that was already applied on the screw shaft; and feeding the polymer impregnated fiber strand from a feeding-in and impregnating zone into screw barrels having a reduced diameter in a discharge and conveying zone.

A preferred embodiment of the plasticating extruder according to the invention that is intended to accomplish at least some of the foregoing objects includes a plasticating extruder for producing fiber-reinforced polymer compositions having a drawing-in and impregnating zone and a discharge and conveying zone, comprising a heater that heats a fiber strand; a first barrel in the drawing-in and impregnating zone; a polymer feed on the first barrel and including at least one coating nozzle; first barrel bores in the first barrel, each first barrel bore having a diameter that is at least four times a thickness of the fiber strand; rotationally driven first extruder shafts in the first barrel bores; a feed opening in the first barrel for introducing a fiber strand into the first barrel bores; a second barrel in the discharge and conveying zone; a cutting edge at an entrance to the second barrel; second barrel bores in the second barrel, each having a diameter that is less than the diameter of the first barrel bores; and rotationally driven second extruder shafts in the second barrel bores.

Additional objects and advantages of the invention will be set forth in the following detailed description, or may be learned by practicing the invention. The objects and advantages of the invention may be realized and obtained with the instrumentalities and combinations particularly described herein.

BRIEF DESCRIPTION OF THE DRAWINGS

The accompanying drawings, which are incorporated in and constitute a part of the specification, illustrate a presently preferred embodiment of the invention and, together with the above general description and the following detailed description, serve to explain the principles of the invention.

DETAILED DESCRIPTION OF THE PREFERRED EMBODIMENTS

Figure 1:
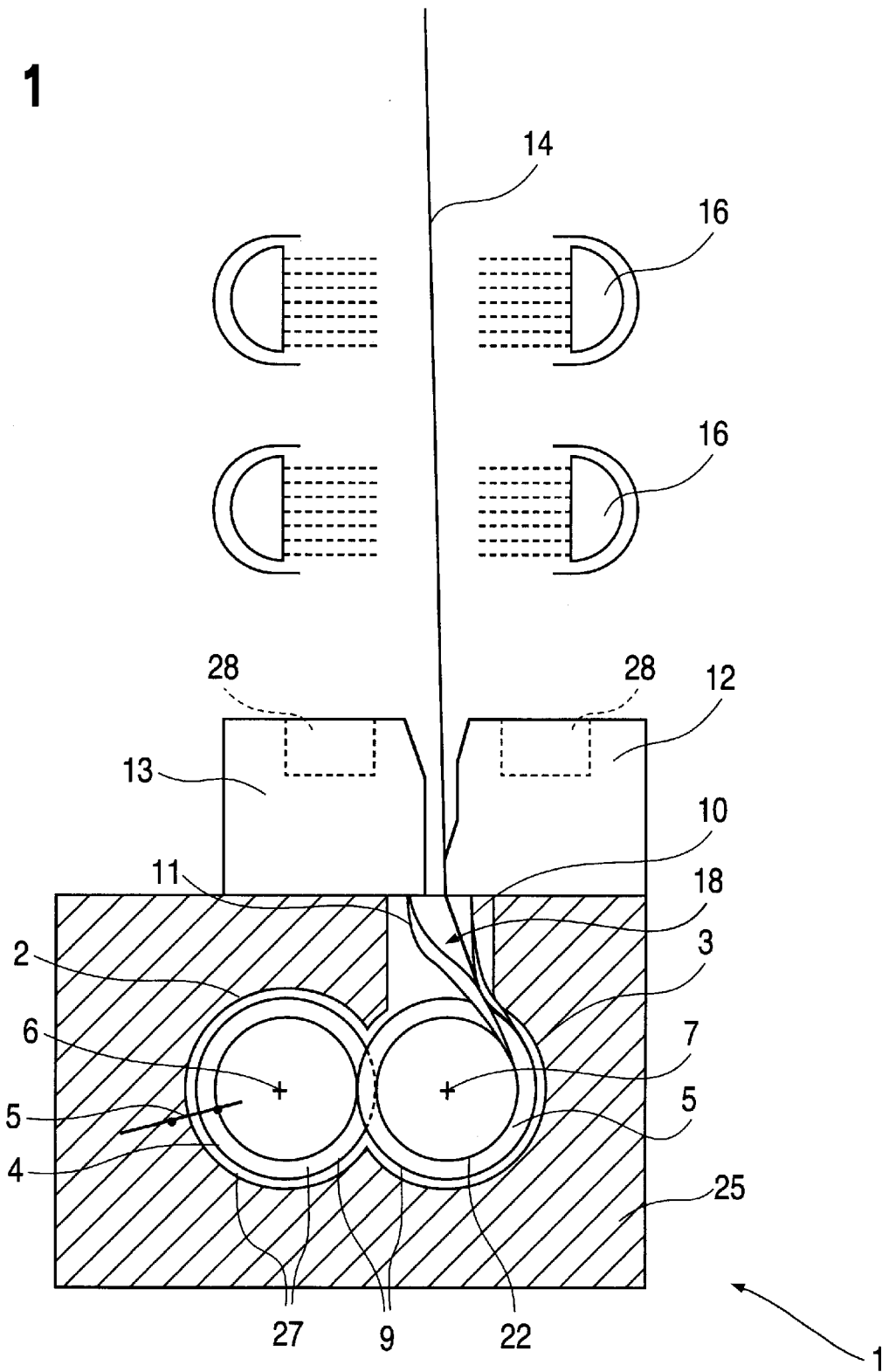
FIG. 1 is a sectional view of a plasticating extruder according to the invention taken along line I—I in FIG. 2.
Figure 2:
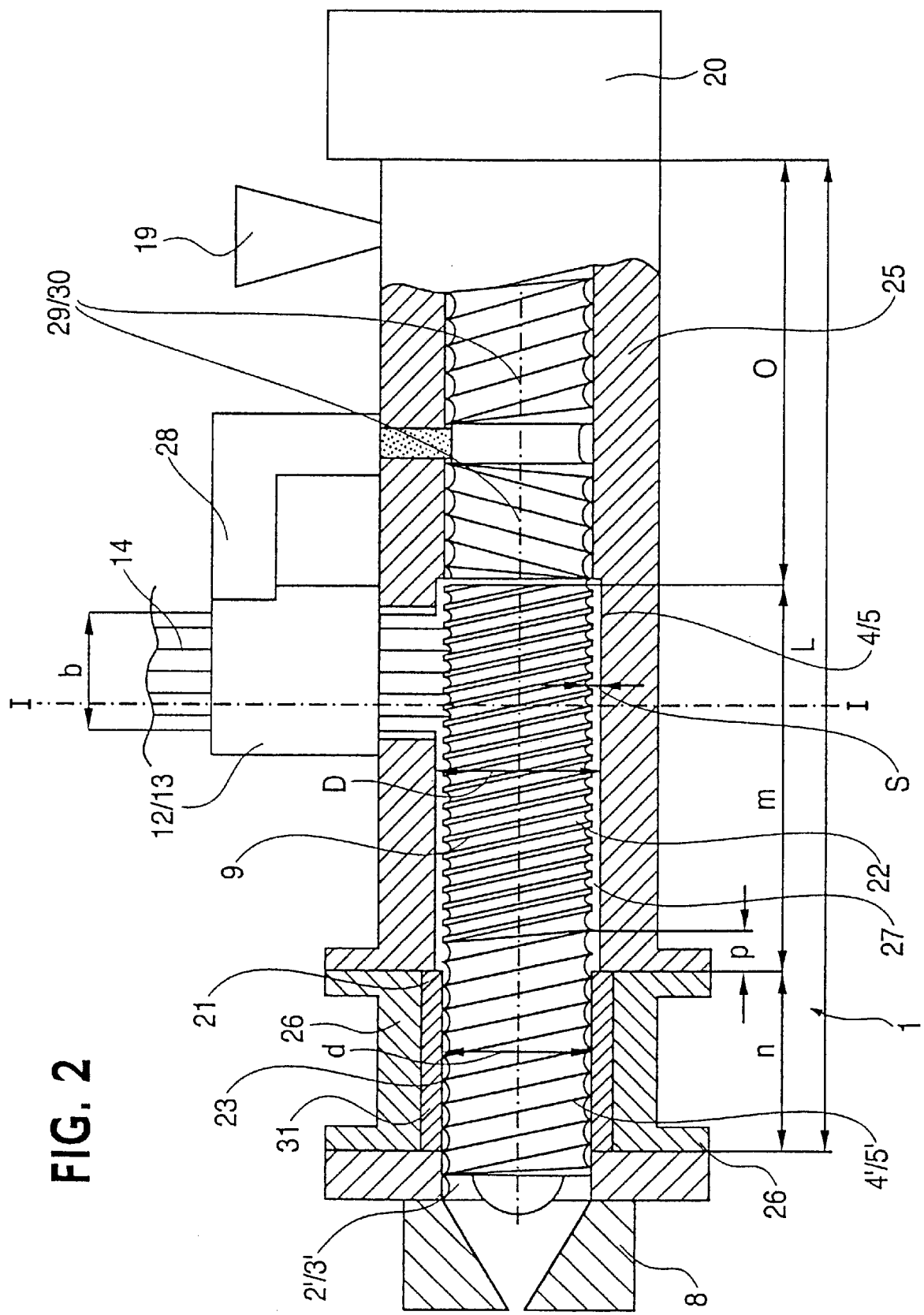
FIG. 2 is a side view of a plasticating extruder according to the invention.

Referring now to the drawings, and initially to FIGS. 1 and 2, there will be seen a plasticating extruder 1 according to the invention. The plasticating extruder 1 is shown as a preferable twin-shaft extruder having a length L. As shown in FIG. 2, the length of the plasticating extruder 1 preferably is divided into three functional regions—a pre-plasticating region "o" for spreading out and melting the polymer; a drawing-in and impregnating zone "m" and a discharge and conveying zone "n." A die 8 is provided at the end of the plasticating extruder 1 to shape the discharge of the finished product 33, which is a fiber-reinforced polymer composition.

FIG. 1, which is taken along line I—I in FIG. 2, shows the drawing in of the fiber strand 14 via the coating nozzles 12 and 13, which are arranged to the left and right of the feed opening 18. A radiation heating device 16 is provided upstream of the coating nozzles 12 and 13 on either side of the width of the fiber strand 14.

As shown in FIG. 2, the plasticating extruder 1 includes a barrel 25 having bores 2 and 3 and axes 6 and 7 for the extruder shafts 4 and 5 of the drawing-in and impregnating zone "m"; a barrel 26 having bores 2' and 3' for the extruder shafts 4' and 5' of the discharge and conveying zone "n"; and extruder shafts 29 and 30 of the pre-plasticating region "o." A filling hopper 19 is located on barrel 25 so that the polymer granules can be fed into the plasticating extruder 1 for preparing the polymer. The polymer feed 28 transports the prepared polymer to the coating nozzles 12 and 13. A drive 20 drives the extruder shafts 29/30, 4/5 and 4'/5'.

During production, the fiber strand 14 is drawn during the conveying movement into the feeding-in channel 27 then in the direction of the product discharge by the screw elements of the extruder over the rounded screw flights 9 and the rounded screw root 22. The fiber strands of the fiber strand 14 thereby also move up and down on the screw flights 9 from the outer diameter to the core diameter and are respectively transferred from the one screw shaft to the other screw shaft when the twin screw extruder has its screws rotating in the same direction. In other words, the fiber strand 14 is conveyed in the manner of a rollercoaster loop, depending on the fiber web width b, overlapping to a greater or lesser extent in the direction of the breaking-up region of the fibers. During these transporting/sliding movements, the liquid polymer (polymer film) 10 and 11 carried along with the fibers is rubbed into the fibers so that all of the fiber filaments are impregnated/coated with polymer. The length of this drawing-in and impregnating zone "m" for all of the intact endless fibers is determined by the tensile forces that must be exerted on the fiber strand 14 so that the fiber strand 14 is driven reliably without disturbing changes in rate.

The fiber strand 14 passes between coating nozzles 12 and 13, which are provided on or at a distance from the barrel 25, into the feed opening 18 of the plasticating extruder 1, which has a width b. The fiber strand 14 is wound up parallel to the extruder axes 6 and 7 and approximately tangentially onto an extruder shaft and around the extruder shafts 4 and 5 multiply in a driving-forward and overlapping manner. The fiber strand 14 is then drawn into barrel bores of screw barrels enlarged in diameter D by at least twice the thickness S of the fiber strand 14. In the feed opening 18, the application of a liquid polymer film 10 onto one flat side of the fiber strand 14, from the right-hand coating nozzle 12, thereby takes place directly, while the application onto the second flat side takes place indirectly by pressing the fiber strand 14 into the liquid polymer film 11 applied in advance from the left-hand coating nozzle 13 onto the extruder shaft 5. The fiber strand 14 is thereby wetted or impregnated with the liquid polymer films 10 and 11 on both flat sides within the drawing-in and impregnating zone "m" with the individual endless fibers rubbing in on the extruder shafts 4 and 5. Subsequently, the individual fibers of the fiber strand 14 impregnated throughout with polymer film 10 and 11 are led out of the feeding-in and impregnating zone "m" via the cutting edge 21; into the cutting bores, which have a reduced diameter d and screw flights 23; into the discharge and conveying zone "n" where the strands 14 are cut up into largely predetermined lengths.

In the case of fiber strands 14 simply to be impregnated and an adapted consistency of the polymer melt, according to a second exemplary embodiment it may suffice to coat the fiber strand 14 with polymer only from one flat side.

Figure 3:
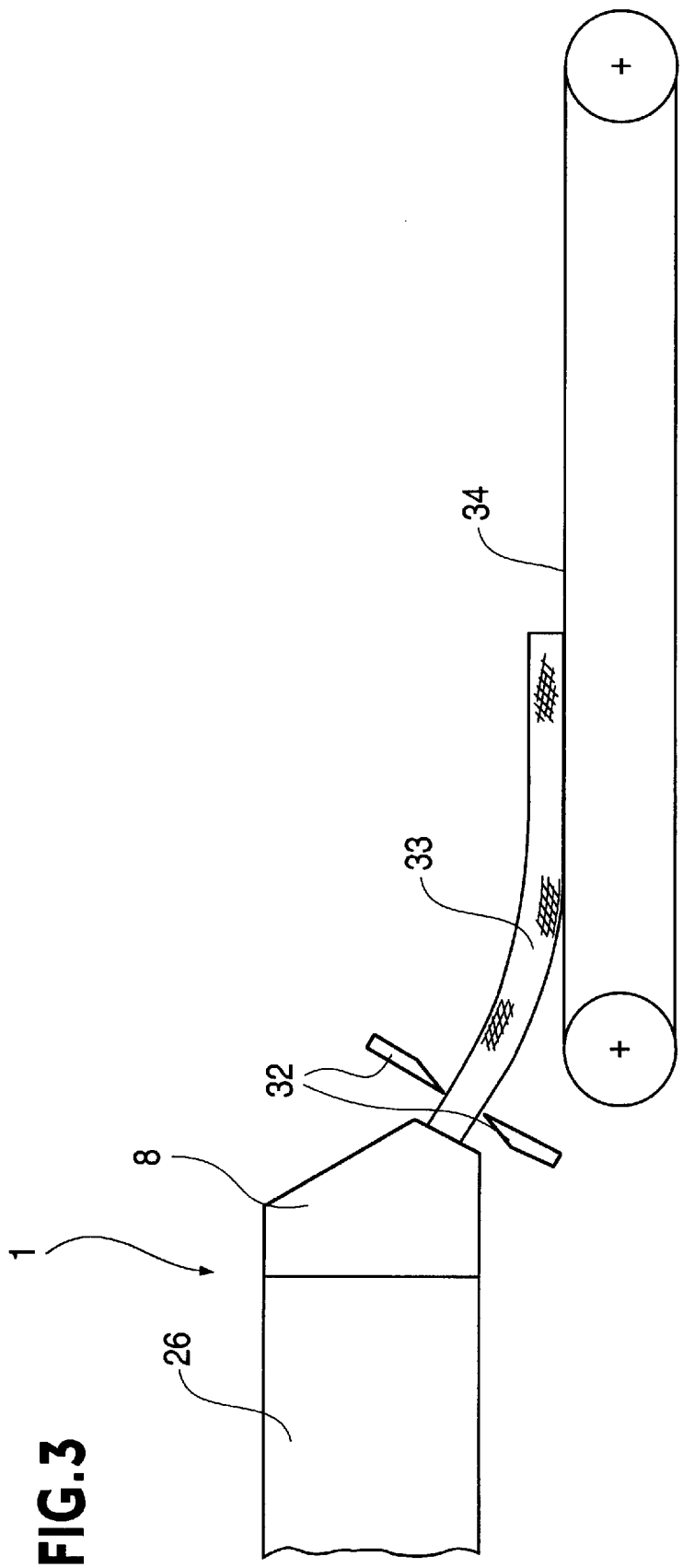
FIG. 3 is a side view of the discharge of the finished product in start-stop mode.

As FIG. 3 shows, it may be advantageous for a specific flow-rate and machine cycle, as well as a productive production cycle, if the plasticating extruder 1 for a discontinuously required product 33 of flow molding processing operates in a start-stop mode. In a start-stop mode, the plasticating extruder 1 conveys the required product 33 out of the die 8 onto a conveyor belt 34 and stops for the cutting off of the product strand. Once the cut-off product 33 has been transported away, the plasticating extruder 1 starts, with the cutting device 32 opened, in dependence on the compressing cycle for the discharge of the next product 33. This operating mode becomes possible because the fiber strands 14 can be driven without disturbing slippage.

Other preferable features of the plasticating extruder 1 include a cutting edge 21 provided on an exchangeable and re-sharpenable wear-resistant bushing 31' screw shafts 2' and 3' of the discharge and conveying zone "n" constructed such that they reach back with one or more screw flights 23 into the drawing-in and impregnating zone "m" by a drawing-in region "n"; instead of a pre-plasticating region o, there is a separate auxiliary plasticating extruder that charges the coating nozzles 12 and 13 with prepared polymer.

If a separate auxiliary plasticating extruder is used, then independent use of rotational speed for the melting of the polymer is advantageously possible. In the alternative, the polymer melt for the fiber coating can be prepared advantageously from a polymer and additives.

For specific applications of the plasticating extruder 1, it may be expedient that, when the fiber strand 14 enters into the feed opening 18 of the plasticating extruder 1, the liquid polymer films 10 may be blown, on one or both sides, with hot gas, for example, air and/or nitrogen.

A preferred embodiment of the method, as described above, includes the following steps: passing the fiber strand through two or more coating nozzles into the feed opening of the plasticating extruder, which has a width b; winding the fiber strand preferably parallel to the extruder axes and approximately tangentially onto an extruder shaft and around the extruder shafts in a driving-forward manner; drawing the fiber strand into barrel bores of a screw barrel, which have a diameter that is at least four times the thickness S of the fiber strand; directly applying, in the feed opening, a liquid polymer film onto a first flat side of the fiber strand from the right-hand coating nozzle; pressing the fiber strand into a liquid polymer film that has already been applied onto the screw shaft by the left-hand coating nozzle; and leading the polymer impregnated fibers out of the feeding-in and impregnating zone along a cutting edge into screw barrels having reduced diameter into a short discharge and conveying zone "n"; and cutting the fiber strand into a predetermined length.

In a second preferred embodiment, the following preferable steps are utilized: passing the fiber strand through two or more coating nozzles into the feed opening of the plasticating extruder, which has a width b; winding the fiber strand preferably parallel to the extruder axes and approximately tangentially onto an extruder shaft and around the extruder shafts in a driving-forward manner; drawing the fiber strand into barrel bores of a screw barrel, which have a diameter that is at least four times the thickness S of the fiber strand; b) impregnating both sides of the fiber strand with a liquid polymer in the feed opening by applying a liquid polymer film onto one flat side of the fiber strand from a coating nozzle arranged to the right of the feed opening and/or applying a polymer film onto the second flat side by pressing the fiber strand into a liquid polymer film that has already been applied onto the screw shaft by the left-hand coating nozzle; and then leading the polymer impregnated fiber strand from the impregnating zone along a cutting edge into screw barrels, which have a reduced diameter, and into a short discharge and conveying zone; cutting the fiber strand into largely predetermined lengths.

One advantage of the method according to the invention, in particular for generating an adequate drawing-in force, is the parallel and tangential feeding in of the fiber web and the driving-forward, if need be multiple, winding up of the fiber strand width onto the screw shafts. Furthermore, it is advantageous that, during the coating of the fiber strand in the feed opening and during the drawing through the feeding-in and impregnating zone m, the fibers are already completely impregnated with the liquid polymer by rubbing in/pressing in, are plasticated and are covered with the polymer in the right mixing ratio. Only thereafter is the fiber strand cut. For the fiber bundles sometimes produced during cutting of the impregnated fibers or fiber strands at the cutting edge of the entry to the discharge and conveying zone, a short discharge and conveying zone suffices to break these fiber bundles up into a homogeneous product and to convey the product strand out of the plasticating extruder without pulsation with a corresponding degree of filling of the screws.

The absence of mixing and kneading elements in the discharge and conveying zone has the effect that virtually no fines are produced by pulverized fibers.

There are many advantages associated with the plasticating extruder according to the invention, including that the plasticating extruder length L is divided into a drawing-in and impregnating zone m and a discharge and conveying zone n; the barrel has barrel bores with a diameter D that is at least four times the thickness S of the fiber strand; one or two coating nozzles are provided over the feed opening and the feed opening is provided in its longitudinal extent preferably parallel to the axes, approximately tangentially over an extruder shaft; at the entry of the discharge and conveying zone "n," there is a shaped or straight cutting edge; and the barrel bores of the discharge and conveying zone have a diameter d that is customary in the case of extruders or a constricted cutting gap.

The advantageous forward-driving winding up of the fiber strand according to the invention onto the rounded elements in the drawing-in and impregnating zone has the effect that great tensile forces can be exerted onto the fiber strand without the individual fibers being cut up, pinched off or torn up. The barrel bores for the extruder shafts have an enlarged diameter so that the fiber strand, which is already carrying the plastic film, can be driven in a guided manner without a disadvantageous retarding obstacle. If the fiber strand is drawn such that it overlaps onto the rounded-off screw flights and the rounded screw root, this diameter must be made at least four times greater than the fiber strand thickness so that the individual fibers are not sheared off from the fiber strand. Reliable driving of the fiber strand is established by increasing the angle of wrap. The fixed slipping movement during conveying of the fiber strand over the screw flights and the screw root as well as the drawing over the rounded-off figure-of-eight bore tips have the effect that the polymer melt is optimally distributed, rubbed and massaged into, onto or around the individual fibers.

In the case of plasticating extruders, the degree of filling of the screws in the plasticating region is responsible for the pulsation of the product discharge. In other words, when the screws are filled inadequately with material, glass fibers and polymer melt per revolution, an uneven product discharge rate is established at the die and is manifested by disturbing fluctuations in weight of the cut-to-length product. The even drawing in of the coated fiber strand and the adaptation dependent on the mixing ratio of the amount of polymer to the amount of fiber by means of the number of individual fibers or by means of their relative strand density according to the invention have the effect of preventing such a harmful pulsation can. For this purpose, a degree of filling of fibers of the fiber strand and the polymer melt in the screws of from 40% to 80% is necessary to achieve conveying which is continuous and without pulsation. This is further made possible by the increased driving force that can be exerted on the fiber strand, because the resultant driving-forward roll on the extruder shafts and the rounded-off design of the screws and of the figure-of-eight bore tips in the drawing-in and impregnating region leave the individual fibers intact up to the cutting edge.

To be better able to influence the driving-forward rate and the degree of overlap, the fiber strand is expediently introduced obliquely in the conveying direction into the feed opening of the plasticating extruder.

Additional advantages and modifications will readily appear to those skilled in the art. The invention, therefore, is not limited to the specific details and representative devices shown and described herein. Accordingly, various modifications may be made without departing from the scope of the invention.

The priority document here, German patent application, DE 198 36 787.2, filed Aug. 13, 1998, is hereby incorporated by reference.

What is claimed is:

1. A method of producing fiber-reinforced polymer compositions using a plasticating extruder, comprising:

passing the fiber strand along at least one coating nozzle into a feed opening of the plasticating extruder;

winding the fiber strand onto and around at least one extruder shaft in a driving-forward manner;

drawing the fiber strand into barrel bores of a screw barrel, wherein a diameter of the barrel bores is at least four times a thickness of the fiber strand;

applying a liquid polymer onto a first flat side of the fiber strand from the at least one coating nozzle;

pressing a second side of the fiber strand into a liquid polymer film that was already applied on the screw shaft; and feeding the polymer impregnated fiber strand from a feeding-in and impregnating zone into screw barrels having a reduced diameter in a discharge and conveying zone.

2. A method of producing fiber-reinforced polymer compositions using a plasticating extruder, comprising:

passing the fiber strand along at least one coating nozzle into a feed opening of the plasticating extruder;

winding the fiber strand onto and around at least one extruder shaft in a driving-forward manner in a drawing-in and impregnating zone;

drawing the fiber strand into barrel bores of a screw barrel, wherein a diameter of the barrel bores is at least two times a thickness of the fiber strand;

applying a liquid polymer onto a first side of the fiber strand from the at least one coating nozzle;

pressing a second side of the fiber strand into a liquid polymer film that was already applied on the screw shaft; and feeding the polymer impregnated fiber strand from the feeding-in and impregnating zone along a cutting edge into screw barrels having a reduced diameter, and into a discharge and conveying zone.

3. A method according to claim 1, wherein the fiber strand is wound multiply onto the at least one extruder shaft within the drawing-in and impregnating zone.

4. A method according to claim 1, wherein the fiber strand is drawn onto the at least one extruder shaft in an overlapping manner.

5. A method according to claim 1, wherein the fiber strand is introduced into the feed opening of the plasticating extruder at an oblique angle.

6. A method according to claim 1, wherein a length of cut-up individual fibers is determined based on a diameter of the screw shaft.

7. A method according to claim 1, wherein a length of cut-up individual fibers is determined based on a screw pitch.

8. A method according to claim 1, wherein a length of cut-up individual fibers is determined based on a number of flights of the screw.

9. A method according to claim 1, wherein, in the applying of the liquid polymer steps, the liquid polymer is blown onto at least one side of the fiber strand.

10. A method according to claim 1, further comprising conforming a width of the polymer film so that it is equal to a width of the fiber strand.

11. A method according to claim 1, further comprising stopping and starting the plasticating extruder to create a discontinuous polymer composition discharge.

12. A method according to claim 1, further comprising:

laying a finished polymer composition onto a conveyor belt;

stopping the conveyor after a predetermined amount of the finished polymer composition is on the conveyor belt;

cutting the predetermined amount of finished product;

transporting the cut predetermined amount of finished product away from the plasticating extruder; and restarting the conveyor belt.

* * * * *